US007340152B1

(12) United States Patent
Talstra et al.

(10) Patent No.: US 7,340,152 B1
(45) Date of Patent: Mar. 4, 2008

(54) METHOD AND SYSTEM OF COPY PROTECTION OF INFORMATION

(75) Inventors: Johan C. Talstra, Eindhoven (NL); Johan P. M. G. Linnartz, Eindhoven (NL); Trevor G. R. Hall, Twickenham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/548,727

(22) Filed: Apr. 13, 2000

(30) Foreign Application Priority Data

Apr. 14, 1999 (EP) ................................. 99302887

(51) Int. Cl.
*H04N 5/91* (2006.01)
*H04N 7/167* (2006.01)
*H04N 5/00* (2006.01)
*H04N 7/00* (2006.01)

(52) U.S. Cl. ........................ 386/94; 386/95; 386/125; 380/201; 380/203

(58) Field of Classification Search ................. 386/94, 386/95, 46, 1, 125–126; 360/60; 380/201, 380/203, 54
See application file for complete search history.

(56) References Cited

U.S. PATENT DOCUMENTS 5,134,496 A * 7/1992 Schwab et al. ............... 386/94
5,915,027 A * 6/1999 Cox et al. ...................... 380/54
5,991,499 A * 11/1999 Yagasaki et al. .............. 386/94
6,374,036 B1 * 4/2002 Ryan et al. .................... 386/94

FOREIGN PATENT DOCUMENTS

WO 9713248 4/1997
WO 9911064 3/1999

* cited by examiner

*Primary Examiner*—Vincent F. Boccio
(74) *Attorney, Agent, or Firm*—Michael E. Belk (57) ABSTRACT

The invention relates to a method of copy-protection of information stored on an information carrying medium. The method allows a reading device (e.g. a DVD drive) and an application device (e.g. an MPEG decoder) to exchange copy-protection information regarding the information carrying medium (e.g. an optical record carrier like a CD or DVD) and the content on that medium. The method is cryptographically secure, taking into account the situation where reading device and application device are connected to an open bus in a personal computer. In view of the high-volume nature of the drive, the method can be implemented cheaply. The inventive method is robust against a so-called man-in-the-middle attack.

The invention relates also to a method of exchanging copy-protection information, to a copy-protection system and to devices for carrying out these methods, in particular a reading device, an application device and a device for playback and/or recording of information.

1 Claim, 5 Drawing Sheets

| Field | Number of bits | Value |
|---|---|---|
| pack_start_code | 32 | 000001BA h |
| '01' | 2 | 01 b |
| SCR_base [ 32 .. 30 ] | 3 | SCR_base [ 32 ] = = 0 |
| marker_bit | 1 | 1 b |
| SCR_base [ 29 .. 15 ] | 15 | |
| marker_bit | 1 | 1 b |
| SCR_base [ 14 .. 0 ] | 15 | |
| marker_bit | 1 | 1 b |
| SCR_extension | 9 | |
| marker_bit | 1 | 1 b |
| program_mux_rate | 22 | 0189C3 x |
| marker_bit | 1 | 1 b |
| marker_bit | 1 | 1 b |
| Reserved | 5 | 11111 b |
| pack_stuffing_length | 3 | |

METHOD AND SYSTEM OF COPY PROTECTION OF INFORMATION

The invention relates to a method of copy protection of information stored on an information carrying medium to be read from a reading device and transmitted to an application device for playback and/or recording. The invention relates further to a method of exchanging copy protection information, to a copy protection system, to a reading device, to an application device and to a device for playback and/or recording of information stored on an information carrying medium.

From WO 97/13248 (PHN 15.391) an arrangement for receiving via a transfer signal encoded content information and supplemental information is known, which content information comprises a watermark at least partly representing the supplemental information, the arrangement comprising a receiver device for receiving the transfer signal, a detector for detecting watermark information in dependence on the watermark, and a decoder coupled to an output of the receiver device for decoding the content information, which receiver device comprises control means for controlling the reproduction of the content information in dependence on the supplemental information.

In the known transfer system information is transferred from the transmitter via a transfer signal to a receiver device, e.g. from a video producer via an optical disc to a disc drive for playback. The document describes that video and audio content is increasingly transmitted and recorded in a digitally encoded form, for example, an MPEG bitstream.

There is a growing need to transfer supplemental information logically related to the content information, which supplemental information is intended for controlling the reproduction of the content information. The supplemental information may comprise information on the rights of the owner or originator of the content information. For example a marker is to be accommodated in such an encoded signal so as to classify the encoded signal as authentic program material. Marking digital signals is particularly useful in copy protection applications, wherein the supplemental information indicates the copyright status. Therefore the supplemental information should be protected against manipulation. The mark, also referred to as watermark, can effectively take the form of a multi-bit watermark pattern representing some supplemental information, e.g. indicating that the encoded signal constitutes copy protected content.

In a digital video system, e.g. based on the digital video-disc (DVD), copy control can be based on detection of electronic watermarking. Watermarks are minor, imperceptible modifications to the video, which can be detected electronically. Such watermarks can be resistant to typical signal processing, including format conversions (e.g. PAL to NTSC), and can be detected to retrieve copyright information about the video. Watermarks are used for playback and record-control.

The basic idea of playback control is that any drive refuses to pass video content if that content contains a watermark that classifies the video as being no-copy while that video is found on a recordable or counterfeit ROM medium. Hence playback control requires detection of the watermark within the drive, and a detector should be on the same chip as the drive control electronics or on the same circuit board in the drive. Noise-like, pixel-domain watermarks are not suitable for detection by a detector in the receiver device, because the complexity of the detector has to remain below a few thousand gates, as drives and DVD recorders are designed as simple storage devices without any 'intelligence' to interpret data. Watermark detection would imply that such devices have to process the content data, e.g. to demultiplex and interpret MPEG video streams, at least including run-length Huffinan decoding of DCT coefficients. Hence a requirement of simplicity of playback control can not effectively be met by pixel-domain watermarks. So the known system has the problem, that the drive must be provided with a complex watermark detector.

Another arrangement for receiving via a transfer signal encoded content information and supplemental information, which content information comprises a watermark at least partly representing the supplemental information, the arrangement comprising a receiver device for receiving the transfer signal, a detector for detecting watermark information in dependence on the watermark, and a decoder coupled to an output of the receiver device for decoding the content information, which receiver device comprises control means for controlling the reproduction of the content information in dependence on the supplemental information, is known from WO99/11064 (PHN 16.517). Embodiments relating to this arrangement for receiving via a transfer signal encoded content information and supplemental information can be found in WO99/11064.

DVD-Video material is currently protected by the DVD-FORUM Content Scrambling System (CSS). The content providers are looking for ways to enhance this protection system and are requesting additional layers of protection for their IP. A set of proposals for a new Content Protection System (CPS) is being considered at the CPTWG based on watermarking the Video content. (CPTWG=Copy-protection Technical Working Group, a copy-protection discussion/standardization forum of consumer electronics-, IT- and film-industries).

This watermark is used to effectuate both playback- and record-control. Record control implies that a recorder refuses to make a copy of a piece of video that contains an appropriate copy-never or copy-no-more watermark, which are explained in WO 99/11064. Because it is relatively easier for a pirate to modify his own recorder than the players of the customers to which he will try to sell his counterfeited video-material, perhaps playback control is more relevant. Playback control entails only allowing playback of content with a watermark, when the information carrier on which the content resides is of a nature compatible with the watermark. E.g. a movie with a watermark "copy-never" should always be on a factory pre-recorded ROM (or "silver") disk. If the movie resides on a recordable ("golden") disk, or a non-authorized "silver" disk, playback should stop. (A more serious form of disk-type distinction is to check whether the pits on the disk do not lie on a regular spiral but on a slightly wobbled spiral; upon copying (even bit-copying) this "wobble" is lost). A similar system is envisioned for audio applications such as SACD and DVD-Audio, or other multimedia applications.

From the point of view of implementing playback control in a digital player, the watermark detector will typically be part of a decoder; by decoder that part of the player is meant that is used to turn the bits from the information carrier into a visible/audible signal (e.g. an MPEG decoder—soft- or hardware—, and/or D/A-converter). On the other hand, the nature of the information carrier will be determined in the so-called drive, which reads the actual bits from tape/disk. The copy-protection information gathered by both pieces of functionality will have to be shared via some protocol, in order to effectuate playback control.

In the sequel, the terms "decoder" and "application" will be used interchangeably and can be implemented as software and/or hardware. From a security standpoint, there is no serious problem in a stand-alone tabletop player, where integration and absence of a well-defined public interface between drive and decoder present almost insurmountable problems to the average hacker. In a Personal Computer environment however, drive and decoder are usually physically separate entities, connected via an open, well-documented (PCI) bus. Furthermore, they communicate under the guidance of an appropriate software application.

This has two implications:
1. The drive and decoder have to decide independently whether to cease playback, based on the information they obtain from each other.
2. The software application orchestrating the actions of decoder and drive cannot be trusted with this decision, as it is easily replaced by a malevolent version (perhaps downloaded from the internet). Moreover, this malevolent version may actively interfere with the autonomous playback control of drive/decoder by intentionally modifying messages from decoder to drive and vice versa.

To increase the security of the watermarking copy protection system, the watermark is generally chosen to be content dependent (e.g. every movie will have it's own watermark, such that hacking the watermark in one film, doesn't necessarily expose all films), which is to be coupled to an appropriate property of the disk. This property is such that it cannot be controlled by the user and can be implemented either logically—e.g. information data in user-inaccessible places like sector headers, in lead-in etc.- or physically—like the medium-type (ROM/recordable/rewritable), or a slight modulation of normal information-carrier parameters (e.g. deformation of pit-shape, or pit-position, as mentioned before). In the sequel such property is collectively referred to as physical mark or diskmark. In other words, the watermark carries a (single or multiple byte) payload, which is related to the payload of the physical disk property. Exchanging these two numbers securely between drive and decoder is the subject of this invention.

There exists a fairly easy hack, the so-called man-in-the-middle attack. This attack makes it necessary for the exchange protocol also to check whether the content arriving at the decoder is (a subset of) the data transmitted by the drive.

Given the mass-product nature of esp. the drive, this protocol should be as simple as possible, and not interfere with the normal functionality of either drive or decoder.

It is therefore an object of the invention to provide a method and a more flexible system for controlling the playback of content information in dependence of supplemental information. The protocol to be provided should therefore be secure against man-in-the-middle attacks, against a hacker obtaining watermark/drive payload, cheap and simple in both soft- and hardware, not impair drive and decoder in their normal functioning and compatible with the constraints of existing standard interfaces, protocols and storage formats.

This object is achieved in accordance with the invention by providing a method of copy-protection as.

The invention has in general for its basic idea to continuously exchange between the reading device, which can also be understood as drive and/or which can be part of the drive, and the application device a characteristic of the content that is being streamed to avoid man-in-the-middle attacks. By comparing the characteristics for verification it can be prevented that a non-compliant decoder, a hacker program and a dummy medium is used like in the man-in-the-middle attack to copy and/or playback of information which shall not be copied. By this attack the application device receives other data than that transferred by the reading device. To thwart this attack according to the invention the reading device reports to the application device a characteristic of the information, e.g. a video, that is transmitted, and the application device reports to the reading device a characteristic of the information that is received. This comparison and verification can be executed at one or more stages of the transmission of the information, i.e. in the reading device and/or in the application device.

Preferably summaries of the transmitted and of the received information or of selected parts of the transmitted and of the received information are used as characteristics. Therefore, the reading device and the application device comprise means for summarizing the information that is transmitted or that is received, respectively.

According to the advantageous development it is provided that the selection of the parts of information to be summarized is based on a secret shared between the reading device and the application device. A communication between the reading device and the application device is thus tamper-proof and secret, provided the secret is not known to the outside world but only shared between the reading device and the application device.

Examples for a secret shared between the reading device and the application device are:
1. The bus-key in CSS (Content Scrambling System, data encryption method for DVD-video disk),
2. a universal secret embedded in drive-silicon and application-silicon or application tamper-resistant software,
3. a key shared as the result of a to be defined secure authentication protocol.

Typically this secret is a 64- or 128-bit number.

The invention can preferably be used for DVD, especially for DVD-video, where the information is stored in a plurality of sectors on an optical record carrier. The invention can however also be generalized to audio or other multimedia formats. In particular for a DVD-video drive where the information is stored in sectors the selection of sectors of information to be summarized can be based on the value of a SCR-base-field of the sectors and/or the presence of a pack-start-code which are the first four bytes in a sector. These can be used as a criterion for considering that sector to contain video, or more precisely, to contain MPEG program stream information. In particular for DVD-video a characteristic or the summary of bullet 0 can be based on the SCR-base-MPEG-field, which can be guaranteed to be transmitted by the reading device and received by the application device. This means that not all data are summarized but just the part related to the correct SCR-base.

The characteristics are exchanged between the reading device and the application device together with or embedded in physical and/or watermark-information of the information carrying medium. This means that the watermark is chosen to be content dependent and is coupled to an appropriate physical property of the information carrying medium, which can be a CD or a DVD.

The above-mentioned object is also achieved according to the invention by a method of exchanging copy-protection information, a copy-protection system, a reading device and an application device, especially for use in a copy-protection system, and a device for playback and/or recording of information. It shall be understood that the method, the system and the devices can be developed further in the same or a corresponding way as described above with regard to the method of copy-protection, thereby having the same or corresponding features. It shall further be mentioned that the invention can also be applied in a transfer system known from WO 97/13248 or WO 99/11064.

The invention will now be further described, by way of illustrative and non-limiting example, with reference to the accompanying drawings, in which.

Figure 1:
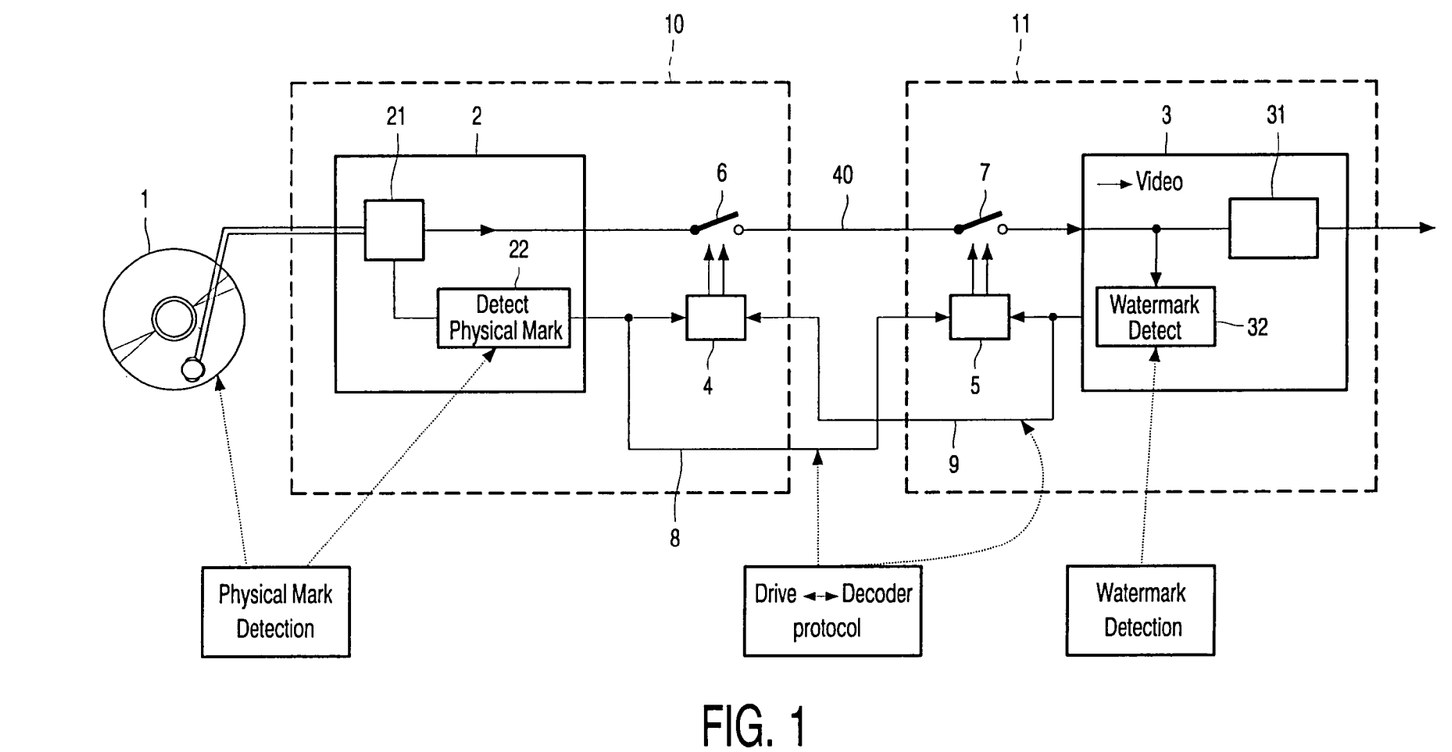
FIG. 1 shows a block diagram of a typical play-control-set-up for a video player.

FIG. 1 shows the typical set-up of a video player. A video stored on a disk 1, e.g. a CD or a DVD, is read by the reading device 2 having a reader unit 21 and a detector 22 for detecting physical marks of the data carrier 1, which can be embedded in the data stream read by the reader unit 21, e.g. embedded in the watermark. The video data is forwarded to an application device 3 having a decoder 31, which is used to turn the bits from the data carrier into a visible signal (or into an audible signal in case of an audio-CD), and a watermark detector 32 for the detection of the watermark embedded in the data stream. The physical mark detector 22 is coupled to a play-control unit 4, which is also coupled to the watermark detector 32. A similar play-control unit 5 is situated on the side of the application and is coupled also to the physical mark detector 22 and the watermark detector 32. Unit 4 or 5 is optional but at least one of unit 4 or 5 has to be present. Copy-protection information gathered by the physical mark detector 22 and the watermark detector 32 is thus over connection lines 8, 9 shared via a copy-protection protocol in order to effectuate playback control. The play-control unit 4 controls a switch 6 and the play-control unit 5 controls a switch 7. These switches can be used to control the transmission and playback of data from the reading device 2 to the application device 3. A transmission of data is for example stopped, if the watermark which is chosen to be content dependent and which is coupled to an appropriate physical property of the data carrier 1 and the physical mark do not fit together. In general, elements 2, 4 and 6 are combined in the drive 10 and the elements 3, 5 and 7 are combined in the application 11 which can be connected, e.g. via a cable or a bus 40.

In a stand-alone table top player where integration and absence of a well-defined public interface between drive and decoder present almost insurmountable problems to the average hacker. In a personal computer environment, however, drive and decoder are usually physically separate entities connected via an open well-documented (PCI) bus. Furthermore, they communicate under the guidance of an appropriate software application. Drive and decoder have therefore independently to decide whether to cease playback based on the information they obtain from each other. The software application orchestrating the actions of decoder and drive cannot be trusted with this decision as it is easily replaced by a malevolent version which may actively interfere with the autonomous playback control of drive/decoder by intentionally modifying messages from decoder to drive and vice versa.

Figure 2A:
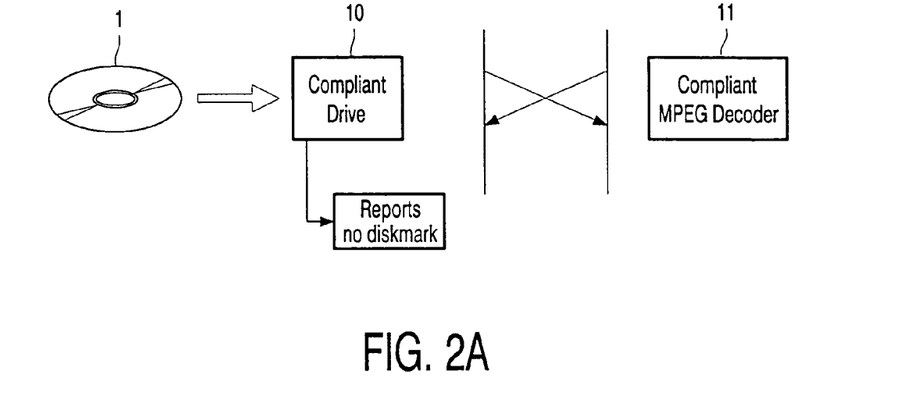
FIGS. 2A,B show a scenario explaining the man-in-the-middle attack.

There exists, however, a fairly easy hack called the man-in-the-middle attack which shall be explained with reference to FIGS. 2A and 2B. In the scenario shown in FIG. 2A a PC with a copy-protection compliant drive 10 and compliant application 11 (in this case an MPEG decoder card) is tricked into playing back an illegally copied disk 1 with a watermarked film, by pirated software controlling drive 10 and decoder 11. Obviously the pirated disk 1 is without the proper diskmark. The software application controlling drive and decoder is pirated (downloaded from Internet etc.). The hack starts out with letting the drive 10 and application 11 authenticate each other, prior to playback. The drive sees no diskmark; this is not illegal in and of itself (a non copy-protected film on disk, or a legacy disk doesn't have a diskmark either).

Figure 2B:
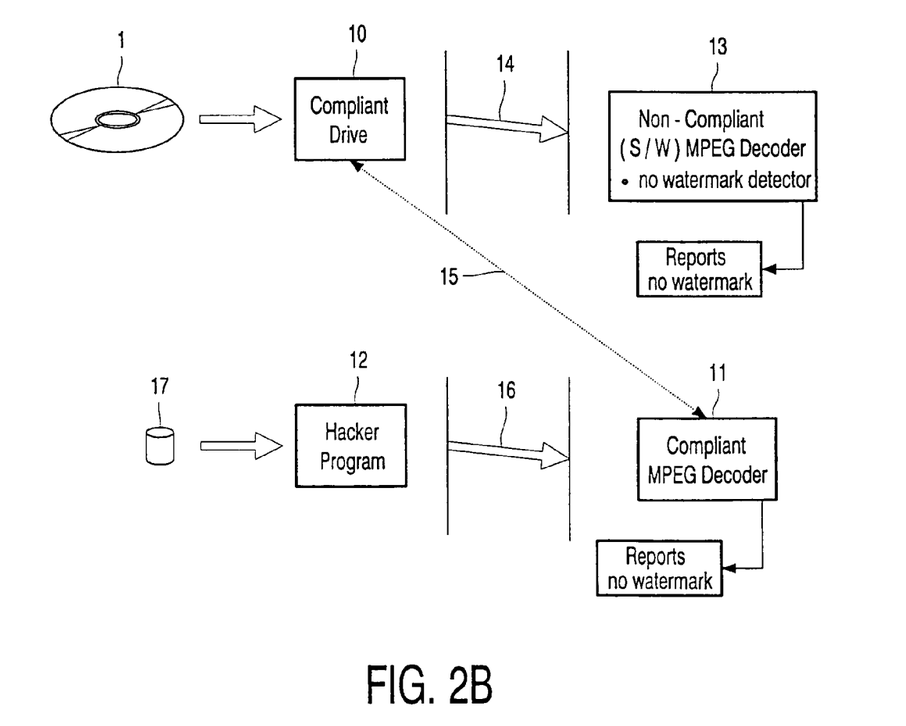

When playback starts, as shown in FIG. 2B, the pirated control software, requests data sectors from the drive 10, and sends them to a non-compliant decoder 13 (e.g. legacy existing software), as indicated by arrow 14, whilst supplying other, pre-recorded data (as indicated by arrow 16) to the compliant decoder card 11, from, say, the hard-disk 17 comprising a dummy content. The data from the disk-drive 1 is watermarked, but this watermark is not recognized by the non-compliant decoder 13. The pre-recorded video from the hard-disk 17 is not watermarked, so the compliant decoder 11 doesn't see a watermark either. In this situation the compliant decoder 11 will tell the compliant drive 10 that it sees no watermarked video, so playback should continue; the drive 10 hasn't seen a diskmark so it also decides that playback is legal.

The vulnerability exploited by this attack is obviously that the drive transfers data different from that received by the decoder 11. To thwart the attack, in the copy-control messages 15, 1. the drive 10 needs to report to the decoder 11 a summary or characteristic of the video that it transmitted,
2. the decoder 11 needs to report to the drive 10 a summary or characteristic of the video that it received.

A complication in this scenario is that not all of the data requested from the drive 10 is sent to the decoder 11: e.g. the table of contents of the disk 1 and other file-management information is read and processed by the operating system, but not by the application. It is therefore essential that the summary that is being exchanged concerns only that part of the data that will end up in the application. If the drive 10 will make a summary based on all data transmitted and the decoder 11 only on the data it receives, a false alarm would be raised even during legal playback.

Figure 3:
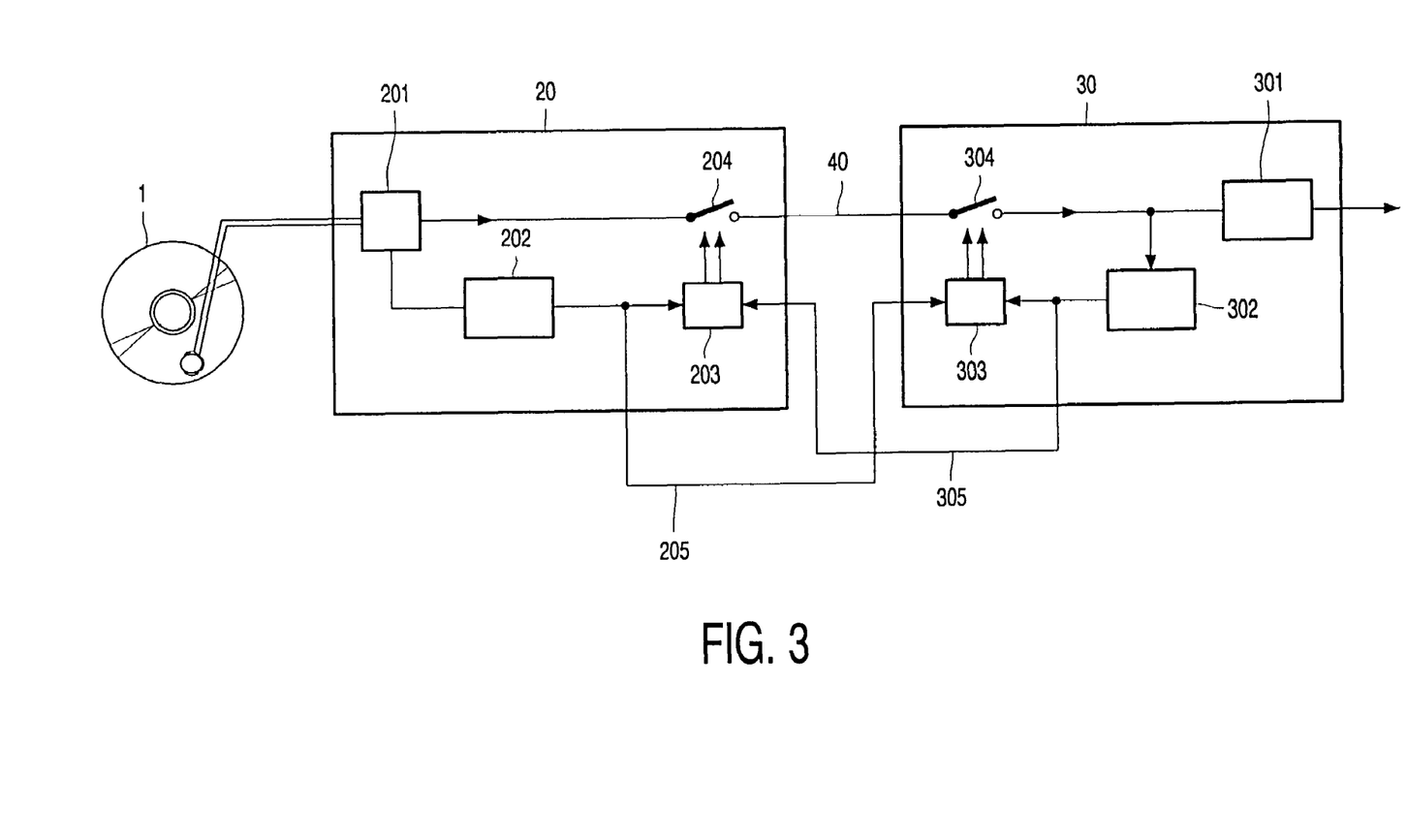
FIG. 3 shows a block diagram of a copy-protection system according to the invention.

A block diagram of a copy-protection system according to the invention is shown in FIG. 3. The drive 20, which can also be referred to as reading device in general, comprises a reader unit 201 for reading data from the disk 1, a reader report unit 202 for summarizing at least parts of the information read from the disk I and reporting it via line 205 to the application device 30 and a verifying unit 203 for controlling a switch 204 in the transmission line 40. The application device 30 comprises a decoder 301 for decoding data transmitted from the reader unit 201, e.g. a video decoder for decoding video data and forwarding it to a not shown video and/or audio rendering device, e.g. a monitor. It comprises further an application report unit 302 for summarizing at least parts of the data received by the application device 30 from the reading device 20 and for reporting these summaries via a line 305 to the reading device 20 and a verifying unit 303 for controlling a switch 304 in the data transmission line 40. The data stored on the disk 1 and transmitted via the transmission line preferably has a watermark and/or the information carrying medium has a diskmark as described above. In the verifying unit 203 a comparison is executed between the summaries reported to it from the reader report unit 202 and from the application report unit 302. The same comparison is executed in the verifying unit 303 in the application device 30. By these comparisons it can be secured that the information that is sent from the reading device 20 to the application device 30 and the information that is received by the application device 30 are identical and that no dummy information without watermark and/or physical mark from a different data carrier is sent to the application device as it is done in the man-in-the-middle attack. If the comparison in one of the verifying units 203, 303 leads to the result, that the information is not identical the respective switch 204, 304 may be switched off in order to stop the transmission playback or recording of data because there is the danger of an attack. The invention thus describes an effective way of copy-protection of the information stored on an information carrying medium.

Additionally, a physical mark detector and/or a watermark detector as shown in FIG. 1 may be included in the reading device 20 and/or the application device 30. For realizing the invention only one of the verifying units 203, 303 would be sufficient.

In order to avoid false alarms it has to be secured that summaries formed in the reader report unit 202 and the application report unit 302 are formed from the same parts of information, e.g. from the same sectors of video data.

For the particular case of DVD-video, a way to construct a unique summary is described in the following. All data on DVD-disks is divided into blocks of 2048 bytes called sectors.

Currently, for the outside world to access data on the disk, the only way is to request entire sectors at a time. The specification of DVD video is such that video data that will be sent to the application (an MPEG decoder card) is never mixed with "administrative data" (like Table of Contents which is not sent to the decoder) in the same sector. The drive has no a priori knowledge, however, to distinguish sectors containing administrative data from those with video.

Figure 4:
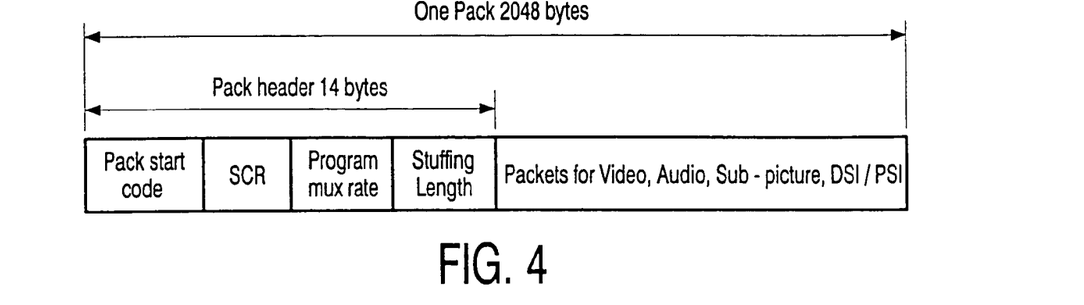
FIG. 4 shows the structure of one pack of data in DVD-video.

According to the DVD-Video specification, the data that will be received by the MPEG-decoder, the MPEG Program Stream stored on a DVD, is organized into a sequence of pack's, all with length 2048 bytes. Every pack is stored in exactly one sector on the disk. Therefore the decoder also knows about sector-boundaries by identifying pack's. A pack has a structure that can be found in FIG. 4.

When a sector starts with a 4-byte pack-start-code, the drive knows that this sector will eventually be received by the decoder. Conversely if the first 4 bytes of the sector do not equal the pack-start-code, the sector is not bound for the decoder, and should be ignored for the "summary" computation. This solves the problem of selecting the right data to compute a summary on.

Because it is computationally too intensive to compute, exchange and verify a summary $C(T_R)$ of each sector that the drive transmits, the drive and decoder should select a few sectors/packs based on their shared secret K. They will compute a unique feature of that sector, and securely exchange that feature together with the watermark/diskmark information. A pirated software driver in the "man-in-the-middle" scenario cannot abuse a compliant decoder by occasionally sending it a sector from the drive, and thus generating a valid Copy Control Message because (s) he would not know, which sector to send.

Figure 5:
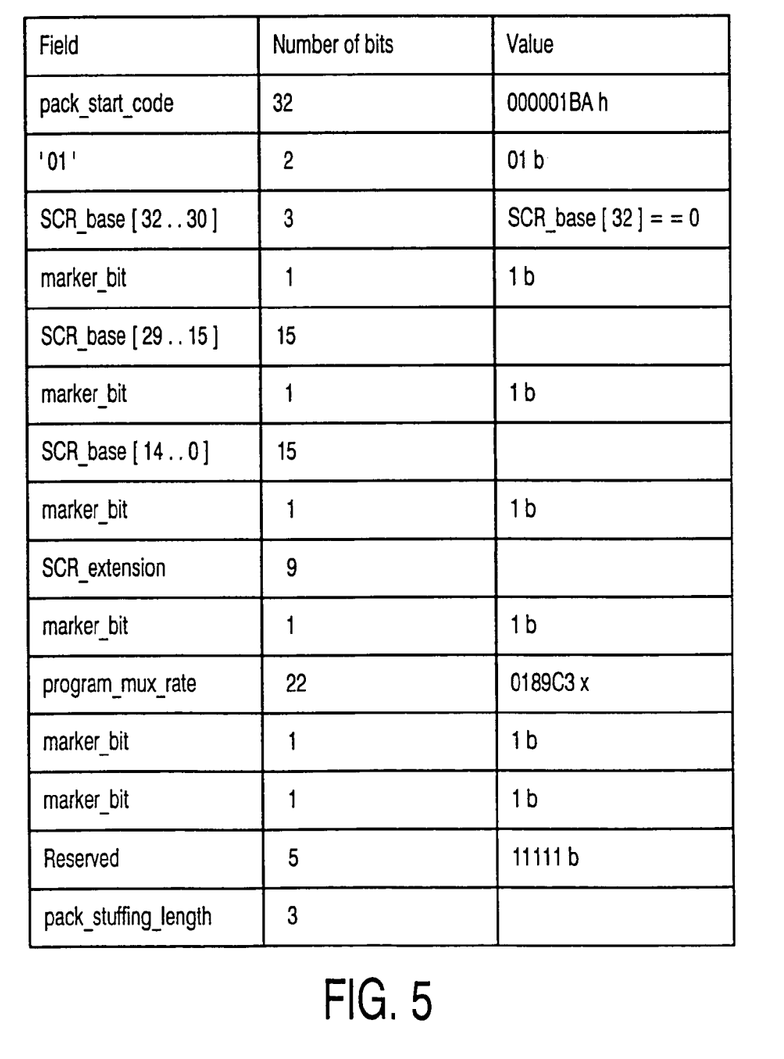
FIG. 5 shows a table with the content of the DVD program stream pack header.

In a table shown in FIG. 5, the SCR-base[ ]-field, or system-clock-reference-base [32 . . . 0] in MPEG-language, equals the number of ticks (mod $2^{33}$) on the MPEG system clock, which runs at 90 kHz. Preferably the value of this SCR-base-field in a sector/pack together with the secret key K is used to determine whether or not this sector/pack is to be "summarized". An example protocol to single out a sector for "summarizing" is given in the flow-chart shown in FIG. 6. The protocol also includes a way to exchange the value of the watermark/physical mark.

Figure 6:
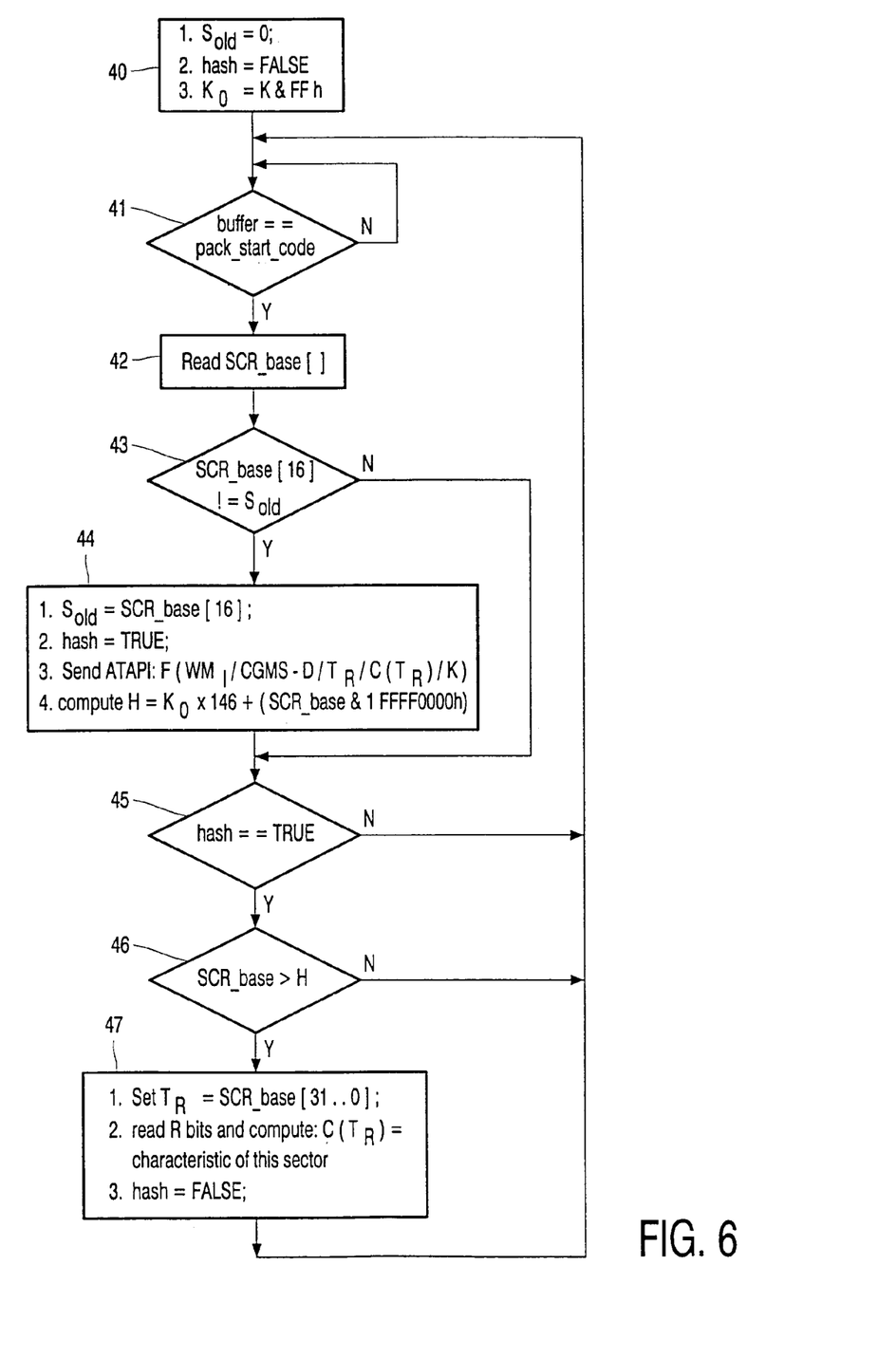
FIG. 6 shows a flow-chart of an example protocol to single out a sector for summarizing.

The following remarks can be made to single steps of the protocol shown in FIG. 6:

Step 41 can optionally be changed into:

buffer==pack_start_code< . . . ><video_packet_start_code>+10 arbitrary bytes.

In step 43 SCR_base[16] flipping from 1 to 0 or 0 to 1 implies approximately 1.4 sec passed.

To step 44 it can be remarked:

ad 3. Only send hash back at fixed intervals, not when computed (otherwise part of secret K revealed)

ad 3. Characteristic $C(T_R)$ is optional, because $T_R$ plays that role ad 4. 146 is # MPEG clock ticks per sector at 10,08 Mbs. optionally 146 can be replaced by 128.

To step 47 it can be remarked:

ad 2. Optional characteristics C can be very small, e.g. 1 bit because of the hash-function F( ). E.g. the parity of the first (16+Ko) bits after pack start_code.

Typically, a summary once per second or per ten seconds should be exchanged. (In the example protocol of FIG. 6 the length of this period is determined in step 43 by monitoring the flipping of bit N of SRC_base[ ]. For N=16, as shown in FIG. 6, the period is $2^{16+1}$ ticks: 90,000 ticks/sec=1.4 seconds (for N=17 it would be 2×1.4=2.8 sec., for N=18 it would be: 5.6 sec etc.). Experiments with real DVD-videos suggest that in such a one sec-period (and certainly in a 10 sec. period), there are. ample sectors transmitted by the drive to allow the example algorithm to function properly. The algorithm of FIG. 6 waits for 1.6 seconds, and then basically selects the Ko'th sector after that point, where Ko is derived from the shared secret K.

From the above detailed description of the invention it can be concluded the following:

In a drive ↔application protocol, drive and decoder need to verify that the content that they are transmitting viz. receiving is the same. This can be done by preferably securely exchanging summaries of the data bound for the application, and the data received by the application.

For DVD-video the drive and application cannot be absolutely certain which part of the data transmitted by the drive will be received by the decoder. To alleviate this problem the drive should only summarize sectors which start with the 4-byte pack_start_code. An improvement to avoid accidental false alarms through occurrence of pack_start_code in a non-video sector, is to also check that sector bytes 14 . . . 17 contain the so-called video_pack_start_code=0x000001E0. For other recording formats, the equivalent of pack_start_code should be chosen: i.e. a sequence of bits which (to a high probability) is unique to a block of data that will be sent to the application, (as opposed to another destination within the PC).

Because summarizing all sectors causes too much overhead (and is unnecessary from a security point of view) drive and decoder may just compute and exchange a summary or characteristic of specific sectors with pre-selected SCR_base[ ]. These sectors should be known only to drive and application. This selection of sectors could be made, based on a shared secret K. For other recording formats, the summary can likewise be computed based on (a characteristic of) a subset of the data transmitted from drive to the application. Selection of the subset should be based on the shared secret K.

To avoid false alarms through a latency and delays in the communication between drive and application (beyond their control), both should store the last few summary-results against which they will verify incoming copy-protection messages.

While the invention has been particularly shown and described with reference to preferred embodiments thereof, it will be understood by those skilled in the art that various changes in form and details may be made therein without departing from the spirit and scope of the invention.

The invention claimed is:

1. A method of copy protection of information stored on an information carrying medium to be read from a reading device and transmitted to an application device for playback and/or recording, wherein the reading device continuously derives and reports to the application device a first characteristic of the content stored on the information carrying medium with the information transmitted from the reading device to the application device wherein the application device continuously derives and reports back to the reading device a second characteristic of the content of the information received by the application device, wherein the characteristics are verified by comparison of the first and second characteristics and wherein the result of he comparison is used to stop the transmission, playback and/or recording of information in case of a mismatch of the characteristics, characteristics in that summaries of the selected parts of the transmitted and the received information are used as characteristics and further characterized in that the information is store in a plurality of sectors in MPEG format on an optical record carrier and that the selection of sectors of information to be summarized is based on the value of a SCR based field of the sectors.

* * * * *